United States Patent
Siegel et al.

(10) Patent No.: US 7,111,546 B2
(45) Date of Patent: Sep. 26, 2006

(54) SALAD SPINNER WITH IMPROVED DRIVE ASSEMBLY

(75) Inventors: Jeffrey Siegel, Kings Point, NY (US); William J. Lazaroff, Floral Park, NY (US)

(73) Assignee: Lifetime Brands, Inc., Westbury, NY (US)

( * ) Notice: Subject to any disclaimer, the term of this patent is extended or adjusted under 35 U.S.C. 154(b) by 0 days.

(21) Appl. No.: 10/894,375

(22) Filed: Jul. 19, 2004

(65) Prior Publication Data

US 2005/0204935 A1    Sep. 22, 2005

Related U.S. Application Data

(60) Provisional application No. 60/554,645, filed on Mar. 19, 2004.

(51) Int. Cl.
*A47J 43/04*    (2006.01)
(52) U.S. Cl. .............................. 99/495; 99/511; 34/58; 34/194
(58) Field of Classification Search .................. 99/495, 99/348, 511–513, 516, 536, 479, 485; 34/8, 34/58, 184; 210/360.1, 380.1, 781, 784; 494/11, 37, 46, 60, 62, 63, 84; 241/282.1, 241/37.5, 92; 366/234, 601; 426/443, 478, 426/601
See application file for complete search history.

(56) References Cited

U.S. PATENT DOCUMENTS

| | | | | |
|---|---|---|---|---|
| 3,885,321 A | * | 5/1975 | Fouineteau | 34/58 |
| 4,209,916 A | * | 7/1980 | Doyel | 34/58 |
| 4,702,162 A | * | 10/1987 | Sontheimer et al. | 99/495 |
| 4,809,723 A | | 3/1989 | Meliconi | |
| 5,064,535 A | * | 11/1991 | Hsu | 210/380.1 |
| 5,562,025 A | * | 10/1996 | Bull et al. | 99/495 |
| 5,865,109 A | * | 2/1999 | Bull | 99/495 |
| 5,904,090 A | * | 5/1999 | Lillelund et al. | 99/495 |
| 5,992,309 A | * | 11/1999 | Mulhauser et al. | 99/495 |
| 6,018,883 A | | 2/2000 | Mulhauser | |
| 6,343,546 B1 | * | 2/2002 | Ancona et al. | 99/495 |
| 6,510,785 B1 | * | 1/2003 | Margolin | 99/495 |
| 6,622,618 B1 | * | 9/2003 | Glucksman et al. | 99/495 |

* cited by examiner

*Primary Examiner*—Timothy F. Simone
(74) *Attorney, Agent, or Firm*—Jenkens & Gilchrist, PC (57) ABSTRACT

A salad spinner for drying food articles and household items includes a transparent bowl and a perforated basket disposed in the bowl. The basket further includes a cylindrical wall connected to a bottom wall of the basket and disposed at its center. The salad spinner further includes a drive assembly attachable to the cylindrical wall of the basket for spinning the basket relative to the bowl whereby water on the food articles is passed through the perforated wall of the basket and displaced to the bowl.

23 Claims, 7 Drawing Sheets

FIG. 4
SECTION A-A

FIG. 3
SECTION A-A

SALAD SPINNER WITH IMPROVED DRIVE ASSEMBLY

RELATED APPLICATIONS

This patent application claims priority from and incorporates by reference the entire disclosure of U.S. Provisional Patent Application No. 60/554,645, which was filed on Mar. 19, 2004.

BACKGROUND OF THE INVENTION

1. Technical Field of the Invention

The present invention relates in general to food appliances and more specifically to food appliances for removing excess water from food articles. In particular, the present invention relates to a salad spinner having a drive assembly separate from a spinner cover and attached to a basket for causing rotation of the basket and a braking system in the spinner cover for stopping basket rotation.

2. Description of Related Art

Salad spinners are well known in the art and are primarily designed for food preparation, particularly in the cleaning and drying of certain food articles. Typically, an individual washes the food articles by immersion in a water bath or by directing a stream of water onto the food articles. In many situations, it is desirable to dry the washed food articles.

Salad spinners in the prior art typically consist of an outer bowl with solid walls and an inner perforated basket adapted to nest and spin within the outer bowl. Food articles are placed in the inner basket and a lid is provided to cover the food articles. A drive assembly is provided in the lid for spinning the inner bowl relative to the outer bowl whereby water on the food articles can be passed through the perforated wall of the inner basket and displaced to collect in the bottom of the outer bowl. A handle for operating the drive assembly is associated with the lid placed over the bowl.

Moreover, due to the drive assembly being provided in the lid, the salad spinner operates to spin only when the lid is placed over the bowl. Additionally, since the drive assembly is provided in the lid, cleaning of the lid becomes a more complicated task.

Therefore, there is a need not only for a salad spinner which removes excess water from food articles, but also provides an improved drive assembly, wherein the drive assembly is associated with a bottom portion of the inner basket of the salad spinner.

SUMMARY OF THE INVENTION

A salad spinner for drying food articles and household items includes a bowl having an open top and a closed bottom. The salad spinner further includes a basket disposed in the bowl, the basket having a cylindrical wall at a bottom portion of the basket. The salad spinner further includes a drive assembly that is attachable to the cylindrical wall at the bottom portion of the basket and actuated for causing the basket to spin relative to the bowl.

In another embodiment, a device for drying food articles and household items includes a bowl having an open top and a closed bottom. The device further includes a basket disposed in the bowl, the basket having a cylindrical wall at a bottom portion of the basket. The device further includes a drive assembly that is attachable to the cylindrical wall at the bottom portion of the basket and actuated for causing the basket to spin relative to the bowl. Furthermore, the device includes a removable lid connectable to a top edge of the bowl, wherein the lid further includes a brake assembly. The brake assembly includes a moveable brake pad engageable with a top edge of the basket for stopping rotation of the basket.

BRIEF DESCRIPTION OF THE DRAWINGS

A more complete understanding of the method and apparatus of the present invention may be acquired by reference to the following Detailed Description when taken in conjunction with the accompanying Drawings wherein.

DETAILED DESCRIPTION OF THE DRAWINGS

With reference now to the drawings, and in particular to FIGS. 1–15 thereof, a novel salad spinner embodying the principles and concepts of the present invention and generally designated by the reference numeral 100 will be described. While the embodiments described herein are intended as an exemplary salad spinner 100 for preparing and drying food articles, it will be appreciated by those skilled in the art that the present invention is not limited for drying food articles, and may be employed for drying other household items.

Referring now to FIGS. 1–15, an embodiment of the salad spinner 100 of the present invention will be described in detail.

The salad spinner 100 includes a transparent bowl 102 and a perforated basket 104 disposed in (nested within) the bowl 102. The bowl 102 has a solid wall construction while a plurality of perforations are defined in at least the side wall of the basket 104. The salad spinner 100 further includes a lid 106 and a drive assembly 300 for rotating the basket 104 relative to the bowl 102.

Figure 1:
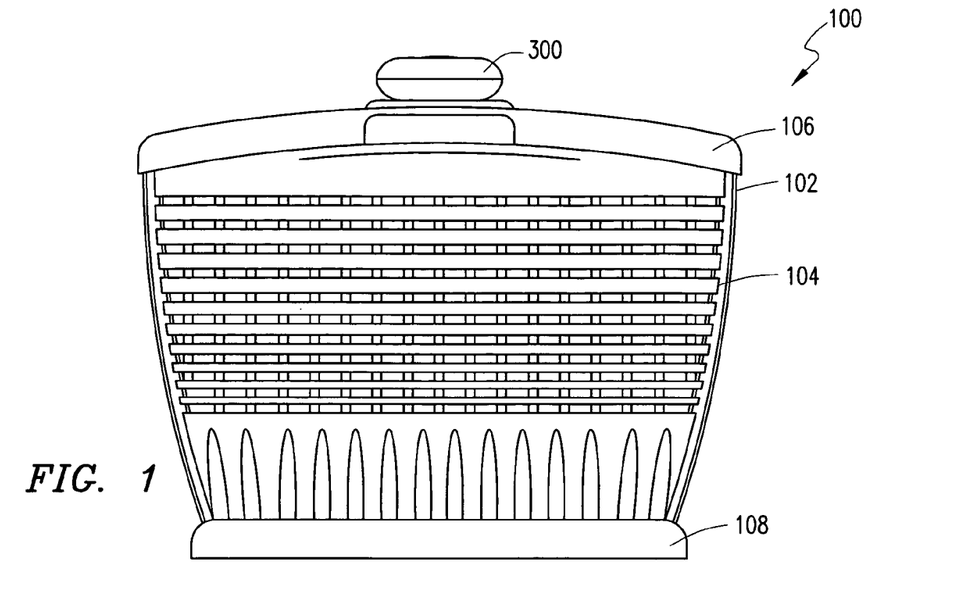
FIG. 1 is a side view of the salad spinner in accordance with the present invention.
Figure 2:
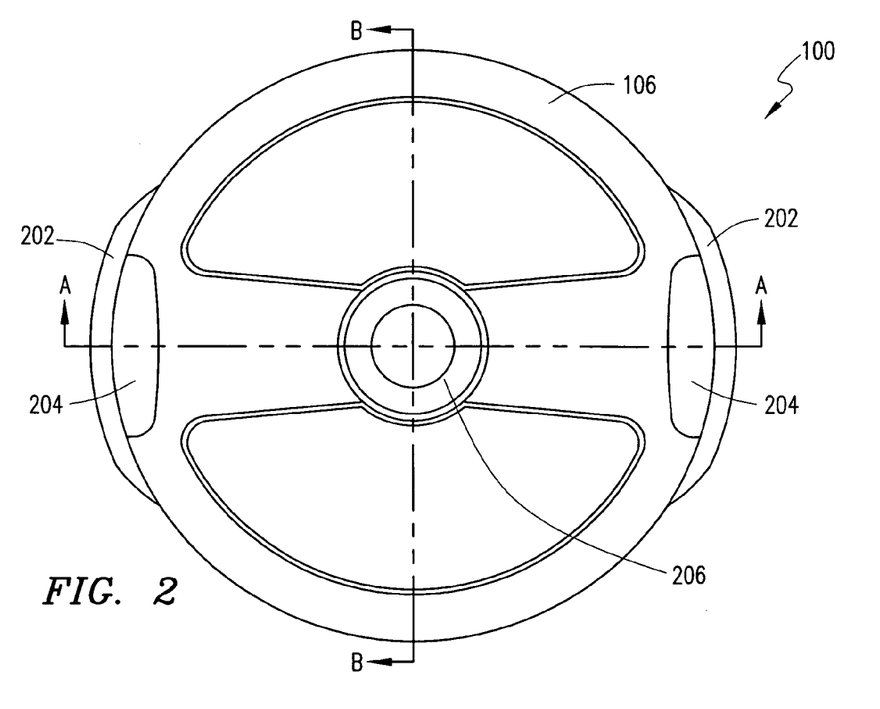
FIG. 2 is a top plan view of the salad spinner in accordance with the present invention.

FIG. 2 illustrates a top plan view of the salad spinner 100 (more specifically, top view of the lid 106). The salad spinner 100 comprises a plurality of handles 202, preferably integrated with and directed outwards from the sides of the bowl 102. The handles 202 provide a means for gripping and lifting the salad spinner 100. FIG. 2 further illustrates a plurality of brake buttons 204 in the lid 106 which are used for stopping the rotation of the basket 104. A detailed description of the brake assembly will be provided with reference to FIGS. 13–15. The lid 106 further includes a cylindrical passage 206 towards the center thereof which allows the components of the drive assembly 300 to pass therethrough such that the drive assembly 300 (FIG. 1) can be attached to the basket 104 without being attached to the lid. In this way, the drive assembly 300 can be used to actuate rotation of the basket 104 without the lid 106 being present.

Figure 3:
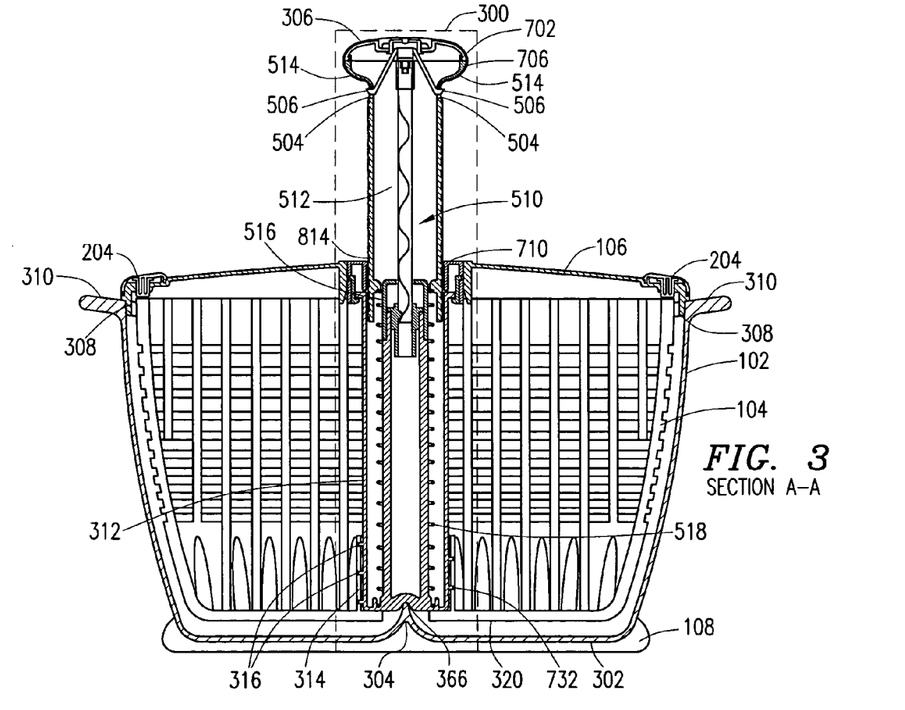
FIG. 3 is a cross-sectional view taken along lines A—A of FIG. 2, illustrating the drive assembly in an unlocked position.

FIG. 3 illustrates a cross-sectional view taken along lines A—A of FIG. 2. In this view the cross-section is taken of the salad spinner 100 along the center of the lid 106 and illustrates the drive assembly 300 in an unlocked position. The bowl 102 is circular in shape and has a central vertical axis A. The bowl 102 further includes a bottom portion 302 having a cone-shaped projection 304 in its center which acts to raise the basket 104 above the bottom portion 302 (to provide a liquid collection space) and further acts as a pivot 366 on which the basket and drive assembly 300 rotates. A non-skid foot 108 is further connected to the bottom portion 302 of the bowl 102. According to an embodiment of the present invention, the foot 108 can be formed from a variety of different materials which possess anti-slip characteristics. The foot 108 is capable of frictionally adhering to a surface with sufficient drag or gripping ability so as to prevent sliding or slipping of the salad spinner 100 during operation. Therefore, the bowl 102 has a surface that defines a non-skid support place that is perpendicular to the axis A and allows the salad spinner 100 to operate with the use of only a single hand. This is achieved since pressure of a plunger 306 is directed along the axis A and the non-skid foot 108 resists any sliding motion perpendicular to axis A across a support surface.

The lid 106 is adapted for interfitting relationship with the bowl 102. The lid 106 includes a downwardly extending circular flange 308 having an outer diameter substantially equal to the inner diameter of a top edge 310 of the bowl 102 thereby forming a fit therebetween.

FIG. 3 further illustrates a substantially cylindrical plunger housing 312 which is part of the drive assembly 300 and a substantially cylindrical wall 314 at a bottom portion 320 of the basket 104. The cylindrical wall 314 of the basket 104 includes spiral grooves 316 to threadably accept spiral threads 732 on the outer surface of the plunger housing 312 and thus attach the drive assembly 300 to, and for rotation of, the basket 104. A detailed description of the drive assembly 300 and the basket 104 will be provided with reference to FIGS. 5–10.

Figure 4:
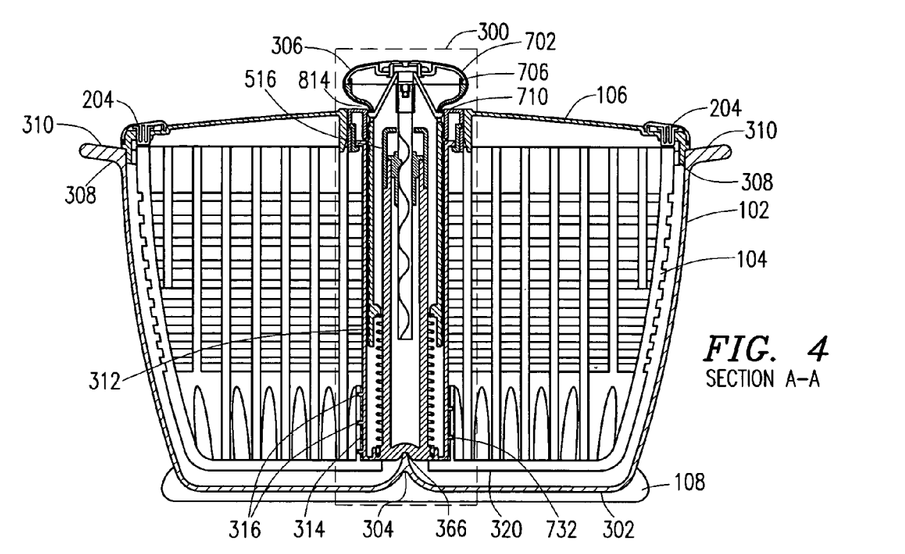
FIG. 4 is a cross-sectional view taken along lines A—A of FIG. 2, illustrating the drive assembly in a locked position.

FIG. 4 illustrates a cross-sectional view taken along lines A—A of FIG. 2. In this view the cross-section is taken of the salad spinner 100 along the center of the lid 106 and illustrates the drive assembly 300 in a locked position. A detailed description of the drive assembly 300 in a locked position will be provided with reference to FIGS. 5–6.

Figure 5:
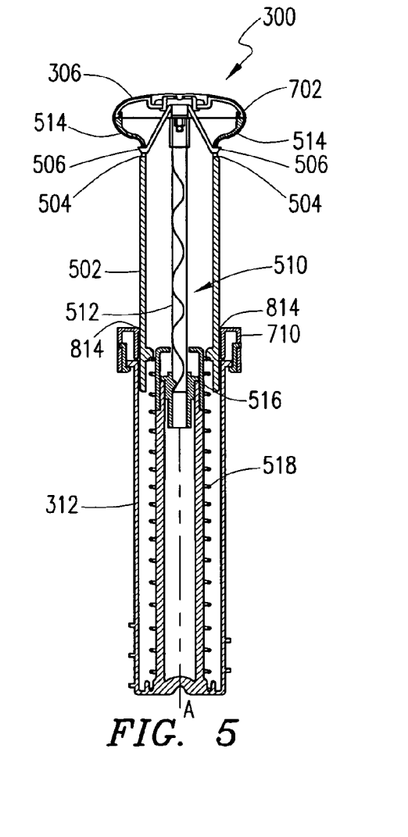
FIG. 5 is an enlarged cross-sectional view illustrating the drive assembly in an unlocked position.
Figure 6:
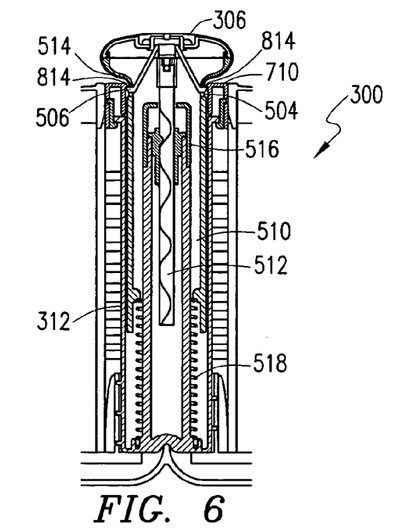
FIG. 6 is an enlarged cross-sectional view illustrating the drive assembly in a locked position.

FIGS. 5–6 illustrate the drive assembly 300 in an unlocked and locked position, respectively. The drive assembly 300 includes a linearly reciprocating plunger structure 306 moveable along vertical axis A. The plunger 306 includes a coaxial cylindrical sidewall or plunger shaft 502 depending therefrom. The plunger shaft 502 is positioned axially within the plunger housing 312. The plunger shaft 502 has slots 504 adjacent to its upper ends through which the ends of plunger clips 506 extend. When downward force is applied to the plunger 306, the plunger 306 and plunger clips 506 move together axially downwardly so that the plunger clips 506 contact the engaging portions 814 of the lid spacer 710. The drive assembly 300 is now in the locked position.

The drive assembly 300 further includes a conversion mechanism 510 for converting the reciprocating movement of the plunger structure 306 to the spinning motion of the basket 104. The conversion mechanism 510 includes an elongated, twisting rod 512 coaxial with the plunger structure 306 and connected at one end to a disc shaped upper end 514 of the plunger 306 preferably near the clip 506. The elongated, twisting rod 512 extends, about to, or a slight distance below, the lower end of the plunger shaft 502.

The conversion mechanism 510 of the drive assembly 300 further includes a ratchet 516 associated with the housing 312 and having a slot shaped to receive the elongated, twisting rod 512 therethrough for screw-type engagement therebetween. The drive assembly 300 additionally includes a compression spring 518 for biasing the drive assembly to return the plunger 306 to the unlocked position after plunger compression.

Downward force on the plunger 306 in the same direction causes the rod 512 to axially move through the slot and causes the ratchet 516 to rotate, which causes rotation of the housing 312. The rotation of the housing 312 results in the rotation of the basket. When force is no longer applied, the rod 512 moves axially upwards which causes opposite rotation of the ratchet 516 without causing the housing 312 to rotate.

Figure 7:
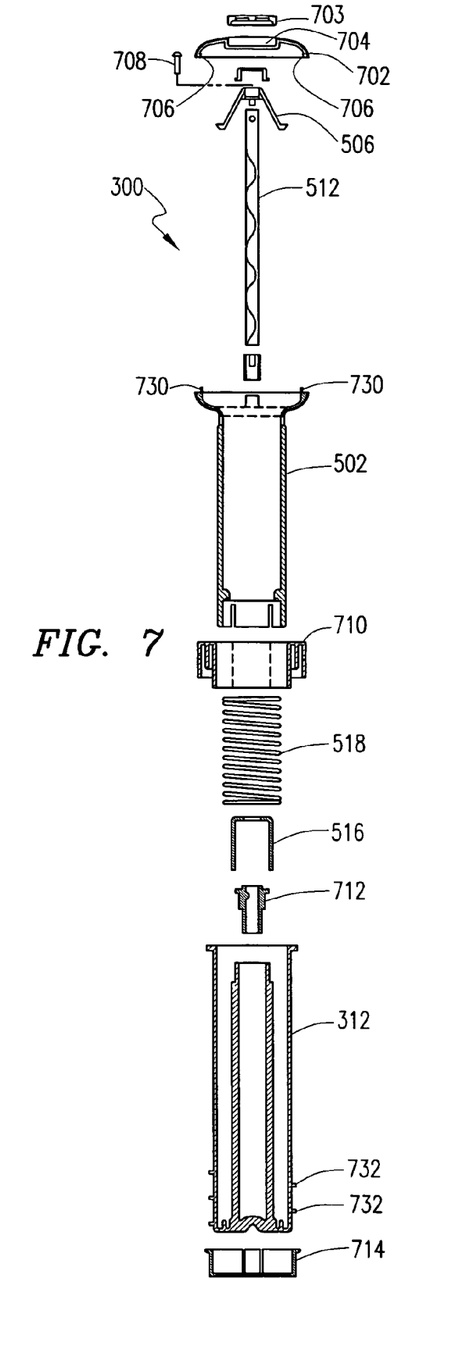
FIG. 7 is an exploded cross-sectional view of the drive assembly in accordance with the present invention.

FIG. 7 illustrates an exploded view of the drive assembly 300 according to the present invention. The drive assembly 300 includes a plunger knob 702 having a slot 704 towards its upper end. The plunger knob 702 further includes two radially inwardly extending projections 706 at its lower end, each forming a shoulder surface. The projections 706 are respectively disposed in the slots 730 of the plunger shaft 502 for attaching the plunger knob 702 to the plunger shaft 502. A plunger button 703 is disposed in the slot 704 towards the upper end of the plunger knob 702.

The drive assembly 300 further includes a screw 708 for screw-type engagement of the plunger clip 506 and the rod 512. Additionally, the drive assembly 300 includes a plunger shaft 502 for connection with the plunger housing 312, a compression spring 518, a lid spacer 710, a ratchet 516, a ratchet 516 keeper and a plunger spacer 714. The plunger housing 312 includes spiral threads 732 to threadably engage with the cylindrical wall 314 (FIGS. 1 and 10) of the basket 104 and attach the drive assembly 300 to the basket 104.

With reference to FIGS. 5–7, the manner in which the drive assembly 300 operates is defined in detail. FIG. 5 illustrates the plunger 306 in an unlocked position. The plunger clips 506 are spaced apart axially from the engaging portions of the lid spacer 710. The compression spring 518 biases the drive assembly 300 to the unlocked position (FIG. 5). When the plunger 306 is depressed, the plunger 306, plunger clips 506 and the attached rod 512 move together axially downwardly so that the plunger clips 506 contact the engaging portions 814 of the lid spacer 710. The plunger 306 is now in the locked position (FIG. 6).

Continuous application of force in the downward direction causes the rod 512 to axially move through the slot and causes the ratchet 516 to rotate, which causes rotation of the housing 312. This causes the engaging portions of the plunger housing 312 to rotate the basket 104 attached thereto about vertical axis A. The plunger 306 may be pressed down until the disc shaped upper end 514 contacts the top of the lid 106. When force is no longer applied, the compression spring 518 causes the plunger 306, the rod 512 and the plunger clips 506 to move axially upwards which causes opposite rotation of the ratchet 516 without causing the housing 312 to rotate. The axial upward movement occurs until the compression spring 518 is completely decompressed and engages with the engaging portions of the plunger shaft 502. The conversion mechanism 510 is now in its unlocked position. The force can be repeatedly applied to rotate the housing 312, and thus the basket 104, in order to remove water from the food articles placed in the basket 104.

Figure 8:
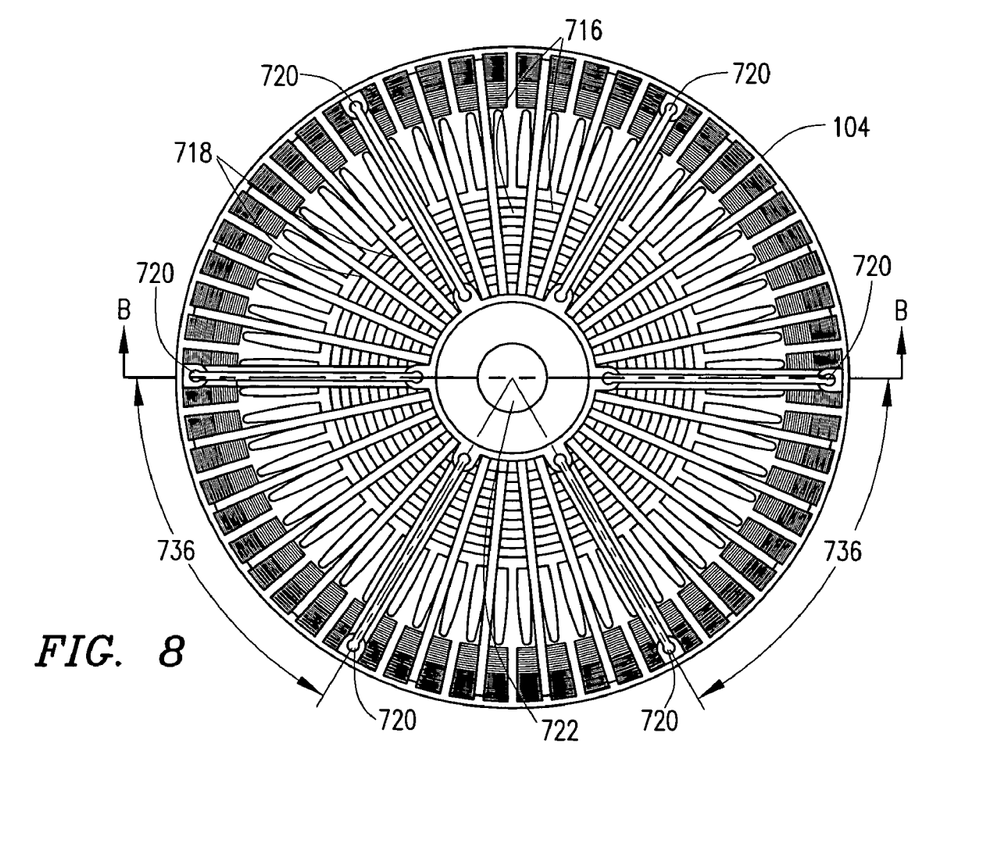
FIG. 8 is top plan view of the perforated basket in accordance with the present invention.
Figure 9:
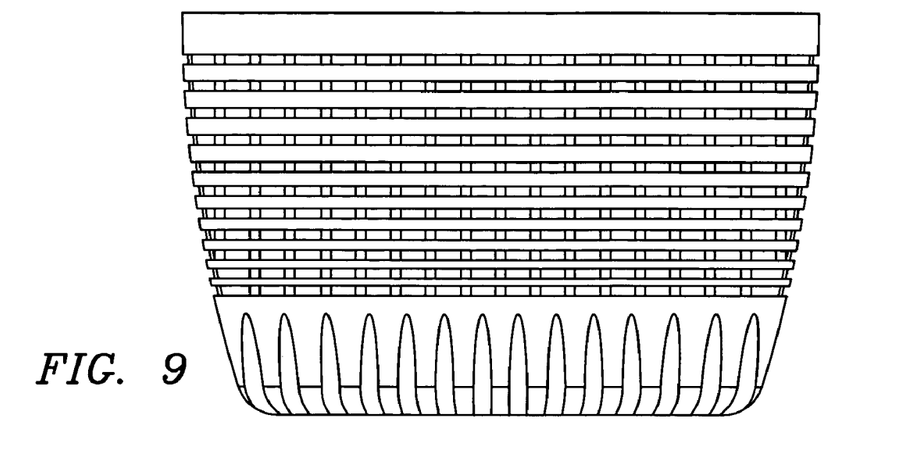
FIG. 9 is a front view of the perforated basket in accordance with the present invention.

FIGS. 8–9 illustrate the basket 104 in further detail. The basket 104 includes a plurality of latitudinal, coaxial circular ribs 716 connected by a plurality of longitudinal ribs 718 of various lengths. The ribs cooperate to define a plurality of various sized, generally rectangular apertures. The basket 104 is formed as a colander having a shape that conforms generally to the shape of, and nests within, the bowl 102. Water discharges through the openings in the basket 104 during the spinning operation for collection in the bottom of the bowl 102.

The basket 104 further includes a plurality of radially extending spacer walls 720 which separate the interior volume of the basket 104 into a plurality of separate regions, in such a way so as to afford access to its interior and enable the introduction and removal of food articles such that different varieties of food articles can be placed in the respective regions and spin without mixing. According to an embodiment of the present invention, the basket 104 and the spacers 720 can be formed from a variety of different materials which are approved for use in food industry (such as plastics).

Figure 10:
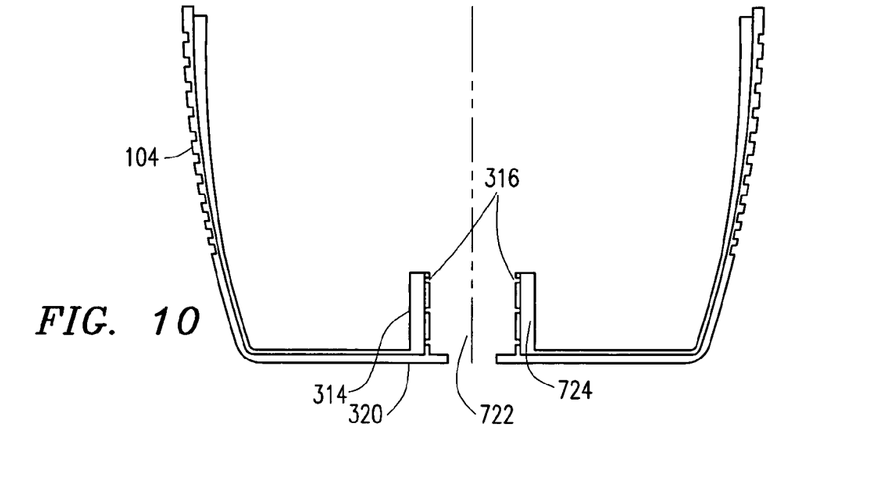
FIG. 10 is a cross-sectional view taken along lines B—B of FIG. 8.

FIG. 10 illustrates the cross-sectional view of the basket 104 taken along lines B—B of FIG. 8. In this view the cross section is taken along the center of the basket 104. The basket 104 comprises a circular opening 722 towards its bottom portion 320. The circular opening is surrounded by a cylindrical wall 314 integrally attached to the bottom portion 320 of the basket 104. The cylindrical wall 314 is slightly raised above the bottom portion 320 of the basket 104. The cylindrical wall 314 further comprises spiral grooves 316 for receiving spiral threads 732 on the outer surface of the plunger housing 312 (FIG. 7) for screw-type engagement therebetween. According to an embodiment of the present invention, the drive assembly 300 for rotating the basket 104 is connected to the cylindrical wall 314 integrally connected to the bottom wall 320 of the basket 104.

Figure 11:
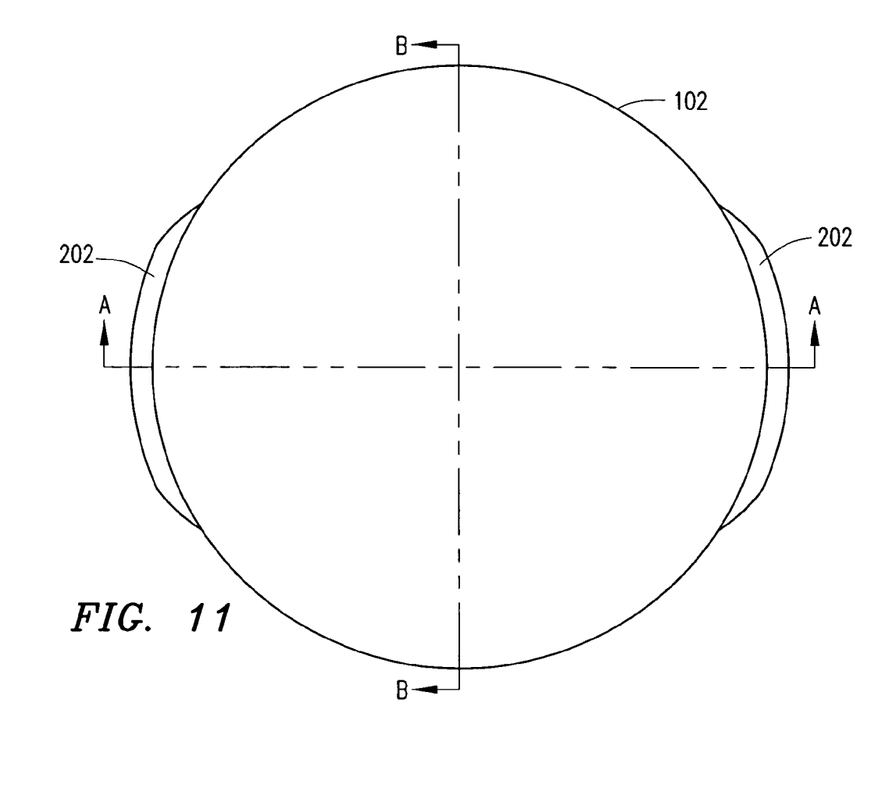
FIG. 11 is top plan view of the bowl in accordance with the present invention.

FIG. 11 illustrates the top view of the bowl 102. The bowl 102 has a solid wall construction and comprises a plurality of handles 202, preferably integrated and directed outwards from the sides of the bowl 102. The handles 202 enable the bowl 102 to be lifted for various purposes. According to an embodiment of the present invention, the bowl 102 can be formed from a variety of different materials which are approved for use in food industry (such as plastics).

Figure 12:
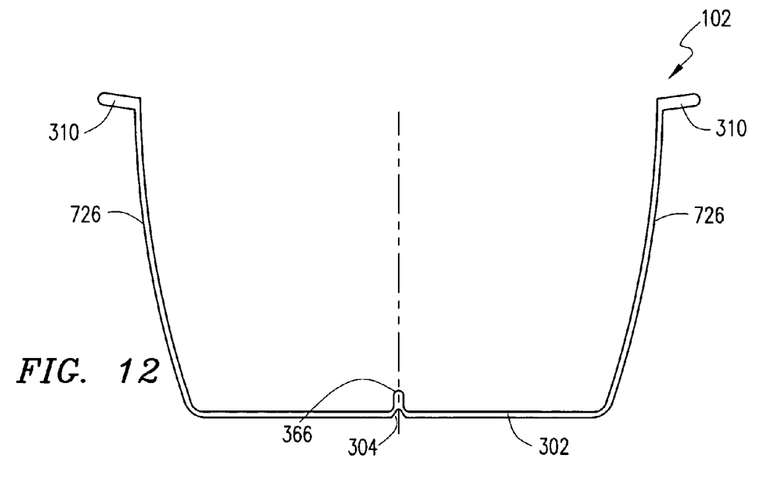
FIG. 12 is a cross-sectional view taken along lines A—A of FIG. 11.

FIG. 12 illustrates the cross-sectional view taken along lines A—A of FIG. 11. In this view the cross section is taken along the center of the bowl 102. The bowl 102 includes side walls 726 and a bottom wall 302. The bottom wall 302 of the bowl 102 further comprises a cone-shaped projection 304 in its center which acts to raise the basket 104 above the bottom portion 302 (to provide a liquid collection space) and further act as a pivot 366 on which the basket 104 and drive assembly 300 rotates.

Figure 13:
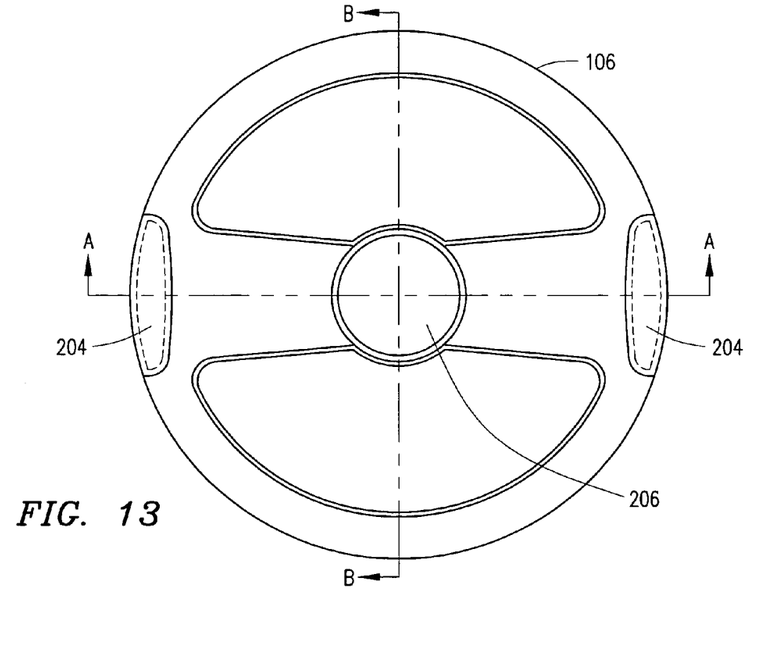
FIG. 13 is top plan view of the lid in accordance with the present invention.
Figure 14:
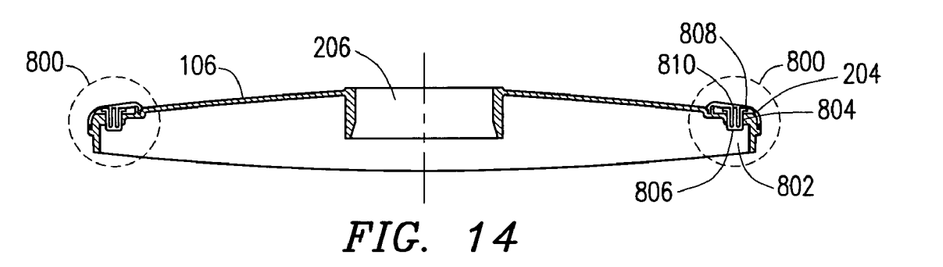
FIG. 14 is a cross-sectional view taken along lines A—A of FIG. 13.
Figure 15:
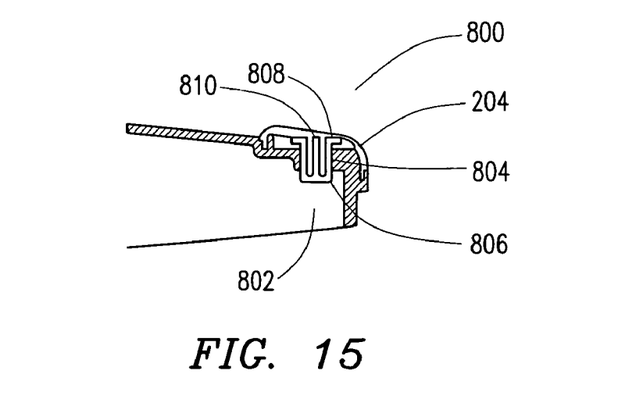
FIG. 15 is an enlarged view of the brake assembly and brake button illustrated in FIG. 14.

FIGS. 13–15 illustrate the lid 106 embodying the brake assembly 800 according to an embodiment of the present invention. The brake assembly 800 includes a brake button 204 coupled to a brake pad 802. The lid 106 is circular in shape and is adapted to fit the bowl 102. The lid 106 comprises a circular passage 206 towards its center for allowing the drive assembly 300 to pass through such that the drive assembly 300 can be engaged to the cylindrical wall 314 of the basket 104 (FIG. 10). The lid 106 further includes brake buttons 204 at peripheral edges of the lid 106. The brake buttons 204 are formed of a flexible and resilient material. According to an embodiment of the present invention, the brake buttons 204 are formed from rubber or plastic.

The brake pad 802 is formed from a hard material. According to an embodiment of the present invention, the brake pads 802 are formed from plastic. The brake pad 802 includes a cylindrical sidewall 804 and a bottom wall 806 integrally attached to the cylindrical sidewall 804. The sidewall 804 has a radially outwardly extending annular flange 808 at its open end and a cylindrical projection 810 projecting up from an inner surface of the bottom wall 806 from its center thereof.

The brake assembly 800 is supported and carried by the lid 106. When the brake assembly 800 is carried by the lid 106, the top wall of the brake button 204 is disposed at the exterior surface of the lid 106. The brake assembly 800 is moveable between a non-engaged position and an engaged position. In the non-engaged position, the basket 104 is free to rotate. However, in the engaged position, a top edge of the brake pad 802 comes into contact with the basket 104 to stop its rotation.

The brake assembly 800 is moved to the engaged position by applying downward pressure on the brake button 204. Upon application of pressure on the brake button 204, the brake pad 802 coupled thereto is moved downwards and comes into contact with the top edge of the basket 104. This causes the basket 104 to stop rotating. When pressure is released, the flexible resilient nature of the brake button 204 biases the brake assembly 800 back to the non-engaged position. In an alternate embodiment, a biasing means (e.g., compression spring) can be used to bias the brake assembly 800 to its non-engaged position thereby allowing the brake button 204 to be formed of any material and/or integrally formed as one-piece unit with the brake pad 802. In an exemplary embodiment of the present invention, only one side of the lid 106 embodying the brake assembly 800 has been described. However, the brake assembly 800 on the other side of the lid 106 is substantially the same.

With reference to FIGS. 1–15, the manner of using the salad spinner 100 will now be described. In use, an individual soaks the food articles and places the food articles in the various portions 736 of the basket 104. Once the food articles are placed in the basket 104, the lid 106 is placed over the bowl 102 for forming a fit therebetween. The drive assembly 300 is now passed through the cylindrical passage 206 towards the center of the lid 106 to be attached to the cylindrical wall 314 of the basket 104 by means of a screw-type engagement. The individual applies a downward force to the plunger structure 306 which results in a rotation of the basket 104 relative to the bowl 102 about the vertical axis A. This spinning creates centripetal force which removes the water from the food articles by way of numerous opening through the basket 104 whereby water on the food articles can be passed through the perforated wall of the basket 104 and displaced to the bowl 102. The rotation of the basket 104 can be stopped by applying downward pressure on the brake buttons 204.

In another embodiment of the present invention, the drive assembly can be attached to the cylindrical wall 314 of the basket 104 without placing the lid 106 over the bowl 102. In this way, the drive assembly 300 can be used by the user to actuate rotation of the basket 104 without the lid 106 being present.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A device for drying food comprising:
    a bowl having an open top and a closed bottom;
    a basket disposed in said bowl, said basket having a side wall and a central cylindrical wall integrally connected to a bottom portion of said basket; and
    a drive assembly attachable to said central cylindrical wall of said basket for spinning said basket relative to said bowl, the drive assembly comprising a cylindrical plunger housing having spiral threads to engage with spiral grooves of said central cylindrical wall of said basket.

2. The device of claim 1, wherein a bottom wall of said bowl comprises a foot.

3. The device of claim 2, wherein said foot possesses a non-skid surface that forms a support plane.

4. The device of claim 1, wherein said bowl is formed from plastic.

5. The device of claim 4, wherein said bowl is transparent.

6. The device of claim 1, wherein said basket includes a plurality of latitudinal coaxial circular ribs and a plurality of longitudinal ribs that define openings through which liquid discharges during said spinning for collection in said bowl.

7. The device of claim 1, further comprising a removable lid having an opening towards a center of said lid through which said drive assembly extends, wherein said lid is connectable to a top edge of said bowl.

8. The device of claim 7, wherein said lid comprises a brake assembly.

9. The device of claim 8, wherein said brake assembly comprises a moveable brake pad engageable with a top edge of said basket.

10. The device of claim 9, wherein said lid includes a plurality of brake buttons disposed at peripheral edges of said lid to actuate said brake pads.

11. The device of claim 10, wherein said plurality of brake buttons are formed from a flexible resilient material.

12. The device of claim 11, wherein said brake pads is formed from plastic.

13. A device for drying food comprising:
    a bowl having an open top and a closed bottom;
    a basket disposed in said bowl, said basket having a side wall and a central cylindrical wall integrally connected to a bottom portion of said basket, wherein said basket further includes a plurality of spacer walls radially extending from the cylindrical wall to the side wall of the basket to separate an interior volume of said basket into a plurality of regions; and
    a drive assembly attachable to said central cylindrical wall of said basket for spinning said basket relative to said bowl.

14. The device of claim 13, wherein said basket and said plurality of spacers are formed from plastic.

15. A device for drying food comprising:
    a bowl having an open top and a closed bottom;
    a basket disposed in said bowl, said basket having a side wall and a central cylindrical wall integrally connected to a bottom portion of said basket;
    a drive assembly attachable to said central cylindrical wall of said basket for spinning said basket relative to said bowl comprising:
        a linearly reciprocating plunger structure moveable between an unlocked and a locked position;
        a housing within which the plunger reciprocates; and
        a conversion mechanism for converting reciprocating movement of said plunger to a rotary motion of said housing.

16. The device of claim 15, further comprising a removable lid having an opening towards a center of said lid through which said drive assembly extends, wherein said lid is connectable to a top edge of said bowl.

17. The device of claim 15, further comprising a removable lid connectable to a top edge of said bowl and having a central opening therein through which said drive assembly passes without being mounted to said lid.

18. A device for drying food comprising:
    a bowl having an open top and a closed bottom;
    a perforated basket disposed in said bowl, said basket having a side wall and a central cylindrical wall integrally connected to a bottom portion of said basket;
    a drive assembly attachable to said central cylindrical wall of said basket for rotating said basket relative to said bowl; and
    a removable lid connectable to a top edge of said bowl and having a central opening therein through which said drive assembly passes without being mounted to said lid.

19. A device for drying food comprising:
    a bowl having an open top and a closed bottom;
    a basket disposed in said bowl, said basket having an open top, a base, an outside cylindrical wall extending from the base and an inside cylindrical wall extending from the base;
    a drive assembly attachable to said inside cylindrical wall of said basket for spinning said basket relative to said bowl comprising:
        a linearly reciprocating plunger structure moveable;
        a housing within which the plunger reciprocates, the housing including means for coupling the housing to the inside cylindrical wall of the basket; and
        a conversion mechanism for converting reciprocating movement of said plunger to a rotary motion of said housing.

20. The device of claim 19, wherein said basket includes a plurality of openings in at least the outside cylindrical wall through which liquid discharges during said spinning for collection in said bowl.

21. The device of claim 19, wherein said basket further includes a plurality of spacer walls radially extending from the inside cylindrical wall to the outside cylindrical wall of the basket to separate an interior volume of said basket into a plurality of regions.

22. The device of claim 19, wherein the means for coupling comprises spiral threads on the housing to engage with spiral grooves formed in said inside cylindrical wall of said basket.

23. The device of claim 19, further comprising a removable lid mountable to the bowl and having a central opening therein through which said drive assembly passes without being mounted to the lid.

* * * * *